United States Patent [19]
Reihl et al.

[11] Patent Number: 5,362,122
[45] Date of Patent: Nov. 8, 1994

[54] VEHICLE ROOF

[75] Inventors: Peter Reihl, Starnberg; Burkhard Reinsch, Neuried, both of Germany

[73] Assignee: Webasto Karosseriesysteme GmbH, Stockdorf, Germany

[21] Appl. No.: 107,575

[22] Filed: Aug. 18, 1993

[30] Foreign Application Priority Data

Aug. 19, 1992 [DE] Germany .............................. 4227402

[51] Int. Cl.$^5$ .............................................. B60J 7/00
[52] U.S. Cl. ..................................... 296/216; 296/220
[58] Field of Search ......................... 296/216, 217, 220

[56] References Cited

U.S. PATENT DOCUMENTS

| | | |
|---|---|---|
| 4,647,106 | 3/1987 | Fuerst . |
| 4,830,428 | 5/1989 | Masuda et al. ................. 296/220 X |
| 4,893,868 | 1/1990 | Miller et al. .................... 296/220 X |
| 5,069,501 | 12/1991 | Baldwin et al. ................ 296/220 X |

FOREIGN PATENT DOCUMENTS

| | | | |
|---|---|---|---|
| 0309775 | 4/1989 | European Pat. Off. ............ | 296/220 |
| 3523882 | 8/1987 | Germany . | |
| 3739127 | 1/1989 | Germany . | |
| 60-15223 | 1/1985 | Japan ................................... | 296/220 |
| 45426 | 2/1991 | Japan ................................... | 296/220 |
| 2193996 | 2/1988 | United Kingdom . | |
| 2257669 | 1/1993 | United Kingdom . | |

*Primary Examiner*—Joseph Pape
*Attorney, Agent, or Firm*—Sixbey, Friedman, Leedom, & Ferguson

[57] ABSTRACT

Vehicle roof with at least one cover part, which is adjustable between a closed position, in which the cover closes a roof opening and is at least approximately flush with the contour of the stationary roof panel, and an open position, in which the cover is brought into a position rising obliquely toward the rear by swinging around an axis of rotation lying near its front edge and is moved rearwardly with reference to the closed position over a rear portion of the stationary roof panel. The cover pan moved toward the rear from the closed position is guided on a roof rail in the area of its rear end.

14 Claims, 2 Drawing Sheets

VEHICLE ROOF

BACKGROUND OF THE INVENTION

1. Field of the Invention

The invention relates to a vehicle roof with at least one cover part, which is adjustable between a closed position, in which the cover part closes a roof opening and is at least approximately flush with the contour of the stationary roof panel, and an open position, in which the least one cover part is brought into a position rising obliquely toward the rear by swinging around an axis of rotation lying near its front edge and is moved toward the rear with reference to the closed position. In particular, where the at least one cover part is guided, by guide elements at its front end, in a longitudinally extending guideway that runs parallel to stationary parts of the roof bordering the roof opening at each side thereof.

DESCRIPTION OF RELATED ART

Vehicle roofs of this type are known by the terms spoiler roof, multicover-spoiler roof or plate roof, and exist in various forms (see, for example, U.S. Pat. No. 4,647,106, German No. DE 35 23 882 C, and British Nos. GB 2,193,996 and GB 2,257,669). It is common to the previously known spoiler roofs that the cover, once brought into the open position, tends to vibrate at higher driving speeds, and as a result, frequently causes disturbing noise. Another drawback of the known spoiler roofs is that a relatively large part of the roof opening remains closed, since the coupling and guiding of the cover rising toward the rear has to be reliably secured in the area of the roof opening. In the case of plate roofs, for the same reasons only a generally very limited plate width is feasible to assure a reliable support of each plate in its front area.

From German patent application DE-A1-37 39 127, a roof hatch of a truck is known, which, to open it, is lifted, guided on vertical guideways of a roof rail, and then, is movable in horizontal guideways crosswise to the driving direction. However, the mechanism shown there is neither able to produce a tilting movement of the rear edge of the cover into an inclined position nor a sliding movement of the cover in this inclined position. The usability of this device is, therefore, limited to vehicles traveling slowly.

SUMMARY OF THE INVENTION

Thus, a primary object of the present invention is to provide a vehicle roof of the above-mentioned type whose roof opening is covered only very slightly in an open position of the cover or the cover parts, and which assures an especially effective guiding of the cover parts even in the open state, and thus causes little extraneous noise, with a very simple design.

This object and others are achieved, according to the invention, in the case of a vehicle roof of the initially mentioned type, by the features that, when the at least one movable cover part is shifted toward the rear from the closed position, it is guided in the area of its rear end to a roof rail on which at least one guide link is placed for guiding rear guide elements of cover parts. Since the at least one cover part is guided in the area of its rear end to a roof rail, and at least one guide link for guiding rear guide elements of the cover parts is placed in or on the roof rail, it is achieved that the cover parts are controlled both forward and toward the rear over their entire displacement area. The guide elements are suitably designed as guide pins that laterally project from the at least one cover part.

Advantageously, the cover parts, in the area of their front end, are guided over front guide elements on an internal longitudinal guideway lying lower than the side edge of the roof opening, and which runs at least approximately parallel to the part of the stationary roof panel laterally bordering the roof opening, so that in the closed position of the cover, its rear guide elements also engage the internal longitudinal guideway. By this means, a position of the cover parts flush with the surface of the surrounding stationary roof is possible in a closed position. Sealing of the roof relative to the interior of the vehicle takes place, in this case, below the internal longitudinal guideway.

The guide link of the roof rail preferably leads to the internal longitudinal guideway at a point which is at or a short distance behind the point at which the rear guide elements of the cover parts are located in the closed position of the cover.

The roof rail, at least in the area of its longitudinal dimension in which the cover parts are located in the open position, can advantageously have side walls running vertically to the lateral facing side edges of the at least one cover part, and the gap between the side walls of the roof rail and the side edges of the at least one cover part is sealed by edge gap seals.

The preferably provided, lateral side walls of the roof rail provide not only for a pleasing appearance, but also produce a further reduction of wind noise. The side walls can be an integral part of the rail or can be a component subsequently inserted in the roof rail.

In the roof according to the invention, the area of the at least one cover part that is pushed out over the roof is slidably guided along the roof rail during opening or partial opening. For this purpose, guide elements are placed at or near the rear edge of the cover parts which engage in guideways that are integrated into the roof rail. The guide elements can be designed, e.g., as pins, and the guideways as grooves. But, any guiding arrangement conventionally used for such guiding purposes can be used.

By coupling the cover to the roof rail, the stability of the cover or the cover parts is substantially increased. In this connection, it should be kept in mind that, previously, such a cover part was guided only in the area which still overlapped the roof opening in the open position of the cover. In the case of spoiler roofs, this area corresponded to about 35% of the longitudinal dimension of the roof opening. While the cover thus was guided over approximately one third of its length, two thirds of its length projected beyond the roof opening toward the rear, thereby causing considerable bending and alternating stresses, especially at higher driving speed, to act on the guideways in the front third. By the solution according to the invention, on the other hand, it has been possible to guide the cover or the cover pans over practically their entire length, and it is also no longer necessary for the cover, in its open position, to overlap a sizeable pan of the roof opening, since only the front edge of the cover has to be guided in the area of the roof opening.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
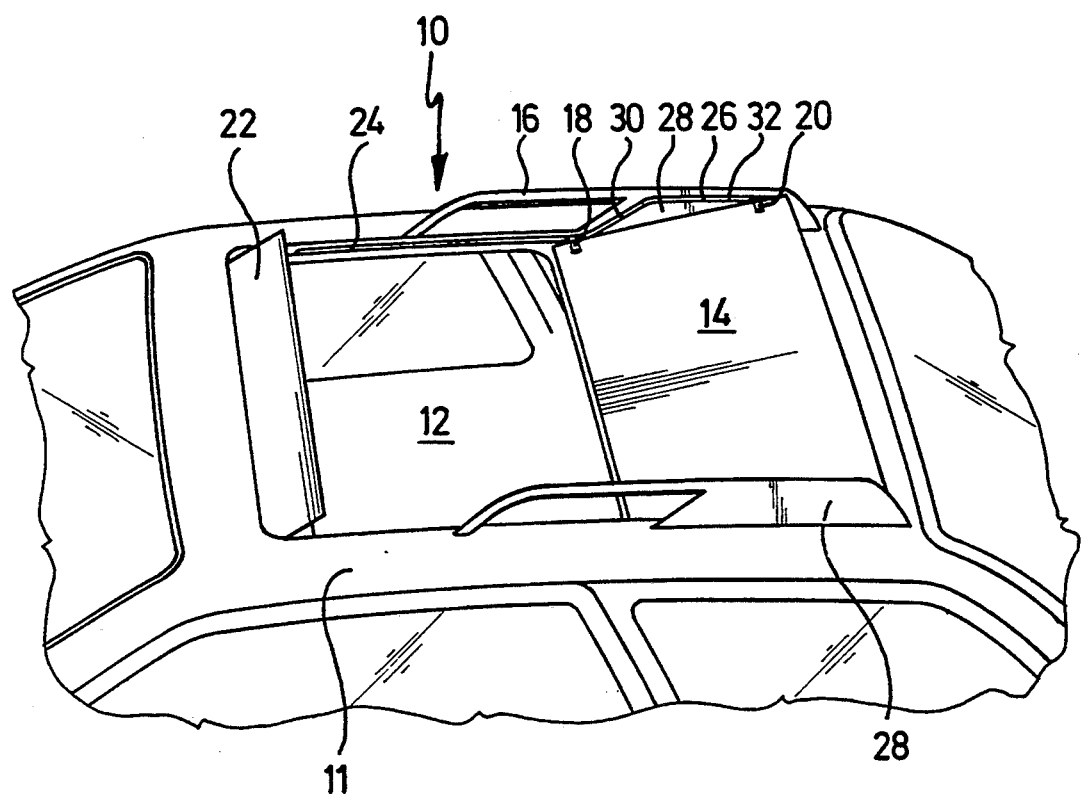
FIG. 1 is a perspective view of a vehicle roof with a roof rail and a spoiler-type cover in an open position.

The vehicle roof designated 10 as a whole in FIG. 1 has a roof opening 12 in a stationary roof panel 11, which can be selectively closed and at least partially opened by a single cover part (cover 14) which can be pushed out and moved back into a pushed-out state over the stationary roof panel 11.

Vehicle roof 10 is further provided with a roof rail 16, which is placed on both sides of roof opening 12, and which extends toward the rear from the opening 12. In the area of the front and rear edges, lateral guide elements 18 and 20, for example in the form of guide pins, are placed on cover 14. The guide elements 18, 20 project laterally outwardly toward the parts of the stationary roof 11 which border roof opening 12 and are used to guide cover 14 between a closed position closing the roof opening and the represented open position practically completely opening roof opening 12. In the area of the front edge of roof opening 12, a wind deflector 22 is placed, which automatically swings upward (in a conventional manner) when cover 14 moves to its open position.

In the sides of roof opening 12, internal longitudinal guideways 24 are located below the side edge of the roof opening, and in which front guide elements 18 and rear guide elements 20 engage in the closed position of the cover 14. A peripheral seal, on a drip molding below internal longitudinal guideways 24, engages under the underside of the stationary. roof 11 at the edge of roof opening 12. Internal longitudinal guideways 24 provide guide cover 14 in the area of its front edge throughout its entire range of displacement. Additionally, the internal longitudinal guideway 24 changes connects with a guide channel 26, that is placed on the inner side of roof rail 16, in which rear guide elements 20 of cover 14 enter if the cover leaves its closed position. Guide channel 26 has a front section 30 that rises obliquely toward the rear and a horizontal section 32 which runs from the front section 30 toward the rear at a distance above the stationary roof panel 11 and basically parallel to it.

Sliding roof cover 14 is reliably guided, between its position closing roof opening 12 and the indicated open position, both in front and in the rear, by the guide elements 18, 20. The displacement mechanism (not shown) can be designed in an especially simple and stable manner using conventional drive cable mechanisms since push-out levers and similar components are unnecessary.

Roof rail 16 is provided with side walls 28 in the area of guide channels 26. These side walls 28 prevent the generation of wind noise on the side edges of sliding roof cover 14, and cosmetically conceal them. The area between side walls 28 and the side edges of cover 14 can be sealed by seals (not represented). The seal can be mounted, in this case, both on cover 14 and on roof rail 16.

With initial moving back of cover 14 from the closed position, rear guide elements 20 enter section 30 of guide channels 26 rising obliquely toward the rear and travel upward therealong. As a result, the cover is swung around an axis of rotation determined by front guide elements 18, and is displaced out of the roof opening 12 and extends over the stationary roof panel 11 like a spoiler roof. After rear guide elements 20 have arrived in parallel sections 32 of guide channels 26, cover 14 only translates without swinging further from the inclined position reached.

Figure 2:
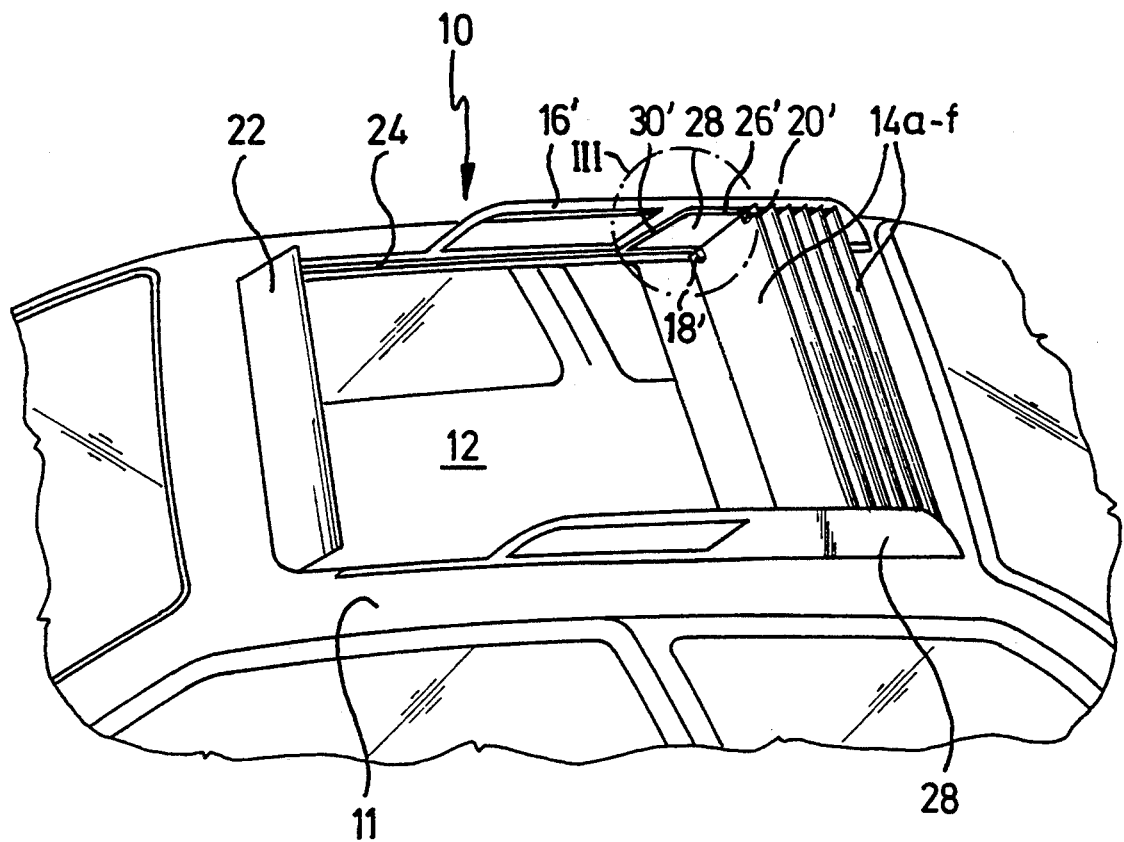
FIG. 2 is a perspective view of a vehicle roof with a roof rail and a plate roof with several cover parts in an open position.
Figure 3:
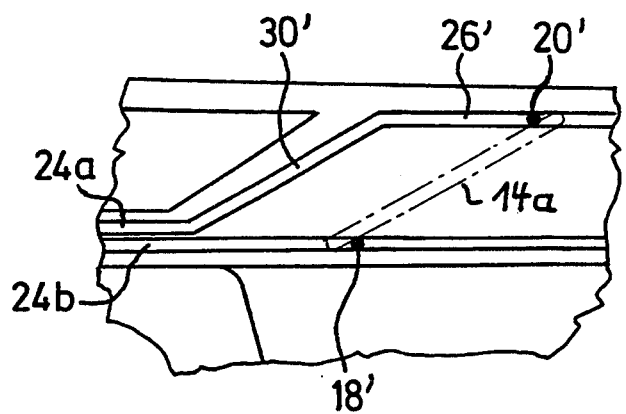
FIG. 3 is a enlarged representation of the roof rail detail encircled in FIG. 2.

In FIGS. 2 and 3, a plate roof is shown, and the same parts are provided with the same reference numbers as in the FIG. 1 embodiment with modifications indicated with a prime (') symbol. In this embodiment, a plate roof is formed from six roof pans (plates 14a-f), and the longitudinal guideway 24 has a track 24a for rear guide elements 20' and a separate track 24b for guiding the front guide elements 18' on each plate 14a-f. The lower longitudinal guideway track 24b, which guides front guide elements 18' of each plate, is located below the upper longitudinal track 24a and runs at a small distance from it. The upper longitudinal guideway track 24a, which guides rear guide elements 20', merges into a guide channel 26', of the roof rails 16' located on stationary roof panel 11', in the area of the rear edge of roof opening 12. Guide channel 26' comprises a section 30' which rises obliquely toward the rear and a horizontal section running in the upper bar of rail 16' rearwardly from front section 30', basically parallel to stationary roof panel 11.

Since each plate 14a-f is guided both on its front end by a guide element 18' and on its rear end by a guide element 20', a reliable supporting of the plates is produced in each position of plates 14a-f, so that the width of each plate can easily be made twice the width previously feasible. A drip molding with a slipped-on seal is also provided below tracks 24a, 24b of the longitudinal guideway 24, for sealing at the edge of roof opening 12, in this embodiment, but is not represented for reasons of simplification.

This invention can be used together with all types of vehicle roofs that can be opened, which have at their disposal at least one cover part projecting above the stationary roof panel in an open state, and which at least partially use a vehicle rail for guiding it. The lateral longitudinal guideways can run at least partially below the stationary roof panel, and in an unillustrated modification, can also have longitudinal guideways for front guide elements below the stationary roof panel and for rear guide elements above the stationary roof panel.

As is apparent from the portion of the vehicle illustrated in the drawings, the invention is particularly suited to use on station wagon or rear hatch type vehicles. Furthermore, the roof rail 16 resembles the side rails of roof luggage racks that such vehicles are frequently equipped with (which have obliquely angled, vertical rail segments connected by a substantially horizontal elongated top rail portion), and those skilled in the art will recognize, as a result, that the present invention is readily adaptable for use as such a luggage rack by the addition of runner-like supports and tie down connectors to the top surface of the stationary roof panel located between the rails and possibly at least part of the top surface of the one or more movable covers 14 or 14a-14f (although, when actually used as a rack to carry luggage or other articles, the cover 14, temporarily, could not be opened).

Thus, while various embodiments in accordance with the present invention have been shown and described, it should be understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A vehicle roof with at least one cover part, which is movable between a closed position, in which the at least one cover part closes a roof opening in a stationary roof panel and is at least approximately flush with parts of the stationary roof panel laterally bordering the roof opening, and an open position, in which the cover part is positioned obliquely rearwardly inclined toward the rear, by having been swung around an axis of rotation lying near a front end of the at least one cover part and has been displaced rearwardly from the closed position to a position above the stationary roof panel; wherein said at least one cover part has front and rear guide elements; wherein a longitudinal guideway is provided running at least approximately parallel to a respective one of the parts of the stationary roof panel bordering each lateral side of the roof opening, and said at least one cover part is guided, in the area of its front end, by said front guide elements in said longitudinal guideway below the lateral side of the roof opening; and wherein a roof rail is provided extending above the stationary roof panel at each lateral side of the roof opening, each roof rail having a guide channel for guiding the at least one cover part, in the area of its rear end, by said rear guide elements when the at least one cover part is displaced rearwardly.

2. Vehicle roof according to claim 1, wherein the guide elements are guide pins which laterally project from the at least one cover part.

3. Vehicle roof according to claim 2, wherein the rear guide elements engage in said longitudinal guideway in the closed position of the cover.

4. Vehicle roof according to claim 3, wherein the longitudinal guideway has a pair of separate tracks, the front guide elements and rear guide elements being guided in a respective one of the separate tracks of said longitudinal guideway.

5. Vehicle roof according to claim 4, wherein at least one of the longitudinal guideway tracks runs below the stationary roof panel.

6. Vehicle roof according to claim 2, wherein a single cover part is provided and the guide channel of each roof rail connects with a respective said longitudinal guideway at a point which is at or a short distance behind the rear guide elements of the cover part when the cover part is in the closed position.

7. Vehicle roof according to claim 5, wherein multiple cover parts are provided, one behind another, and the guide channel of the roof rail connects with a respective said longitudinal guideway at a point which is at or a short distance behind the rear guide elements of a rearmost one of the cover parts when the cover parts are in the closed position.

8. Vehicle roof according to claim 7, wherein each roof rail, at least in the area of its longitudinal dimension, in which the at least one cover part is located in said open position, has a vertically running side wall for laterally concealing lateral edges of the at least one cover part in said open position.

9. Vehicle roof with at least one cover part, which is movable between a closed position, in which the at least one cover part closes a roof opening in a stationary roof panel and is at least approximately flush with parts of the stationary roof panel laterally bordering the roof opening, and an open position, in which the cover part is positioned obliquely rearwardly inclined toward the rear, by having been swung around an axis of rotation lying near a front end of the at least one cover part and has been displaced rearwardly from the closed position to a position above the stationary roof panel; wherein said at least one cover part has front and rear guide elements; wherein a longitudinal guideway is provided running at least approximately parallel to a respective one of the parts of the stationary roof panel bordering each lateral side of the roof opening, and said at least one cover part is guided, in the area of its front end, by said front guide elements in said longitudinal guideway; and wherein a roof rail is provided on the stationary roof panel at each lateral side of the roof opening, each roof rail having a guide channel for guiding the at least one cover part, in the area of its rear end, by said rear guide elements when the at least one cover part is displaced rearwardly; wherein the roof rail, at least in the area of its longitudinal dimension, in which the at least one cover part is located in said opening position, has a vertically running side wall for lateral concealing lateral edges of the least one cover part in said open position.

10. Vehicle roof with at least one cover part, which is movable between a closed position, in which the at least one cover part closes a roof opening in a stationary roof panel and is at least approximately flush with parts of the stationary roof panel laterally bordering the roof opening, and an open position, in which the cover part is positioned obliquely rearward inclined toward the rear, by having been swung around an axis of rotation lying near a front end of the at least one cover part and has been displaced rearwardly from the closed position to a position above the stationary roof panel; wherein said at least one cover part has front and rear guide element; wherein a longitudinal guideway is provided running at least approximately parallel to a respective one of the parts of the stationary roof panel bordering each lateral side of the roof opening, and said at least one cover part is guided, in the area of its front end, by said front guide elements in said longitudinal guideway; and wherein a roof rail is provided on the stationary roof panel at each lateral side of the roof opening, each roof rail having a guide channel for guiding the at least one cover part, in the area of its rear end, by said rear guide elements when the at least one cover part is displaced rearwardly; wherein a single cover part is provided and the guide channel of the roof rail connects with the longitudinal guideway at a point which is at or a short distance behind the rear guide elements of the cover part when the cover part in the closed position.

11. Vehicle roof according to claim 10, wherein the rear guide elements engage in a respective said longitudinal guideway in the closed position of the cover.

12. Vehicle roof with at least one cover part, which is movable between a closed position, in which the at least one cover part closes a roof opening in a stationary roof panel and is at least approximately flush with parts of the stationary roof panel laterally bordering the roof opening, and an open position, in which the cover part is positioned obliquely rearwardly inclined toward the rear, by having been swung around an axis of rotation lying near a front end of the at least one cover part and has been displaced rearwardly from the closed position to a position above the stationary roof panel; wherein said at least one cover part has front and rear guide elements; wherein a longitudinal guideway is provided running at least approximately parallel to a respective one of the parts of the stationary roof panel bordering each lateral side of the roof opening, and said at least one cover part is guided, in the area of its front end, by said front guide elements in said longitudinal guideway; and wherein a roof rail is provided on the stationary roof panel at each lateral side of the roof opening, each roof rail having a guide channel for guiding the at least one cover part, in the area of its rear end, by said rear guide elements when the at least one cover part is displaced rearwardly; wherein multiple cover parts are provided, one behind another, and the guide channel of each roof rail connects with a respective said longitudinal guideway at a point which is at or a short distance behind the rear guide elements of a rearmost one of the over parts when the cover parts are in the closed position.

13. Vehicle roof with at least one cover part, which is movable between a closed position, in which the at least one cover part closes a roof opening in a stationary roof panel and is at least approximately flush with parts of the stationary roof panel laterally bordering the roof opening, and an open position, in which the cover part is positioned obliquely rearwardly inclined toward the rear, by having been swung around an axis of rotation lying near a front end of the at least one cover part and has been displaced rearwardly from the closed position to a position above the stationary roof panel; wherein said at least one cover part has front and rear guide elements; wherein a longitudinal guideway is provided running at least approximately parallel to a respective one of the parts of the stationary roof panel bordering each lateral side of the roof opening, and said at least one cover part is guided, in the area of its front end, by said front guide elements in said longitudinal guideway; and wherein a roof rail is provided on the stationary roof panel at each lateral side of the roof opening, each roof rail having a guide channel for guiding the at least one cover part, in the area of its rear end, by said rear guide elements when the at least one cover part is displaced rearwardly; wherein said roof rail is in the shape of a roof luggage rack side rail.

14. Vehicle roof according to claim 13, wherein said roof rail has obliquely angled, vertical rail segments connected by a substantially horizontal elongated top rail portion.

* * * * *